United States Patent [19]
Degani et al.

[11] Patent Number: 5,091,988
[45] Date of Patent: Feb. 25, 1992

[54] ARTICLE FOR CONNECTING OPTICAL FIBERS

[75] Inventors: Yinon Degani, Highland Park; Robert M. Kimball, Lanoka Harbor; George J. Shevchuk, Old Bridge, all of N.J.

[73] Assignee: AT&T Bell Laboratories, Murray Hill, N.J.

[21] Appl. No.: 684,129

[22] Filed: Apr. 12, 1991

[51] Int. Cl.⁵ .................................. G02B 6/36
[52] U.S. Cl. ...................................... 385/70
[58] Field of Search ................ 350/96.20–96.22

[56] References Cited

U.S. PATENT DOCUMENTS

| | | | |
|---|---|---|---|
| 4,225,214 | 9/1980 | Hodge et al. | 350/96.21 |
| 4,406,514 | 9/1983 | Hillegonds et al. | 350/96.21 |
| 4,470,660 | 9/1984 | Hillegonds et al. | 350/96.21 |
| 4,475,790 | 10/1984 | Little et al. | 350/96.21 |
| 4,645,292 | 2/1987 | Sammueller | 350/96.20 |
| 4,830,456 | 5/1989 | Kakii et al. | 350/96.20 |
| 4,919,508 | 4/1990 | Grace et al. | 350/96.20 |
| 4,973,127 | 11/1990 | Cannon, Jr. et al. | 350/96.22 |

*Primary Examiner*—Akm Ullah
*Attorney, Agent, or Firm*—Martin I. Finston; Eugen E. Pacher

[57] ABSTRACT

An optical fiber connector pair is provided, which includes a plug assembly and a receptacle. An optical connection can be repeatedly made and broken by insertion and withdrawal, repectively, of the plug assembly relative to the receptacle. The final alignment of the mating fiber ends is provided by a pair of silicon blocks, each having a guiding groove formed in one surface. One block is included in the receptacle, and the other block is included in the plug assembly. One fiber end is affixed in each groove. The act of inserting the plug assembly in the receptacle brings the grooved surfaces together such that each fiber is captured by the opposing groove.

6 Claims, 5 Drawing Sheets

ARTICLE FOR CONNECTING OPTICAL FIBERS

FIELD OF THE INVENTION

The present invention relates to apparatus for effecting a releasable, optically transmissive connection between at least one pair of optical fibers.

Many conventional methods for connecting optical fibers involve elaborate procedures for preparing the ends of the fibers and for aligning them. However, there are applications, for example in the consumer market, where faster and simpler connection methods are advantageous because they can reduce costs. Where such methods also involve releasable connections, they are even more advantageous because they can enhance the flexibility of the systems being interconnected without substantially increasing the cost of installation.

One desirable form that a fast, releasable fiber connection may take is a connector pair comprising a plug and a receptable. The end of one fiber that is to be connected is mounted within the plug. The end of a second fiber to be connected is mounted within the receptacle. It is particularly desirable to mount the mating fiber ends without first affixing them within ferrules, as is often done in the prior art. Although ferrules add mechanical strength and convenience in handling, they also increase cost and preparation time.

The connection is desirably effected by manually inserting the plug within the receptacle. Similarly, the connection is desirably broken by manually withdrawing the plug from the receptacle. It is particularly desirable to include at least one spring-loaded member that holds the plug and receptacle together when the connection is effected, but that can be released by, e.g., manually depressing a portion of such member. One advantage of a connector pair using such a snap-locking mechanism is that it can be assembled more quickly and conveniently than, e.g., a threaded connector pair that is assembled by tightening a nut.

Apparatus for releasably connecting fibers substantially as described above has, in fact, been made. Such a connection is described, for example, in U.S. Pat. No. 4,225,214, issued to M. H. Hodge, et al. on Sept. 30, 1980. In the Hodge receptacle, the receptacle fiber end lies within a fiber-guiding passageway. When the receptacle is inserted within the plug housing, a slideable cylinder surrounding the end of the plug fiber is retracted, thereby exposing the fiber end. The fiber end enters the passageway and mates with the end of the receptacle fiber. In one embodiment described by Hodge, the receptacle includes spring arms having locking lugs. When the connection is assembled, the spring arms snap into mating recesses in the plug. The connection can be unlocked for disassembly by manually compressing the spring arms.

A connector pair such as that of the Hodge patent is quite complex, and is manufactured from relatively many, i.e., about 15, individual piece parts, some of which are of complicated design. As a consequence, manufacturing costs may price such a connector out of low-cost, high-volume markets.

Thus, a need has remained for a fast, releasable plug-and-receptacle combination that can be manufactured inexpensively. Desirably, such apparatus would include relatively few parts requiring precision machining, and those parts that did require precision machining would be of relatively simple design.

SUMMARY OF THE INVENTION

Described below is an optical fiber connector pair which can be made by ordinary manufacturing techniques, and which requires only two high-precision parts. Each of the high-precision parts is a simple silicon block having a substantially linear groove formed on a major surface thereof.

The connector pair described herein is useful for making an optical connection between ends of respective first and second optical fibers such that the connection can be repeatedly made and broken by insertion and withdrawal, respectively, of the first fiber end. In a general sense, it comprises first support means for supporting an end portion of the first fiber, said means being moveable such that while affixed therein, the first fiber end can be moved relative to the second fiber end; and second support means for supporting an end portion of the second optical fiber such that it is substantially stationary during insertion and withdrawal. The second support means are adapted to receive therewithin, during insertion, at least a portion of the first support means. The first support means comprise a first silicon member having a substantially planar first principal surface and a first groove formed in said first surface such that the first fiber end can be supported in a portion of the first groove; and the second support means comprise a second silicon member having a substantially planar second principal surface and a second groove formed in said second surface such that the second fiber end can be supported in a portion of the second groove. During insertion, the first and second surfaces are substantially parallel and oppositely facing, and the first and second grooves are substantially parallel. The apparatus further comprises means for directing the motion of the first support means during insertion, such that the perpendicular distance between the first and second principal surfaces initially decreases until a portion of the first fiber is captured within the second groove and a portion of the second fiber is captured within the first groove, and thereafter, the first and second fibers contactingly slide within, respectively, the second and first grooves such that the longitudinal axes of the first and second fiber end portions are substantially collinear and the first fiber end approaches the second fiber end along the mutual axis.

DETAILED DESCRIPTION

Figure 1:
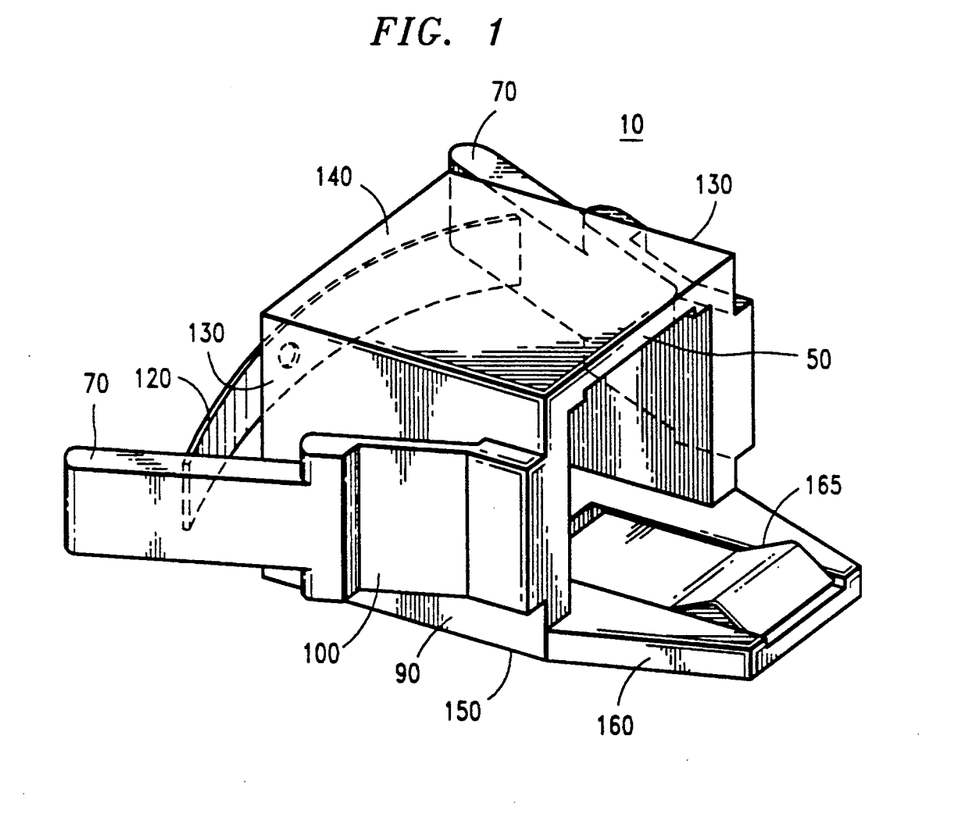
FIG. 1 is a perspective view of a plug housing, made according to one embodiment of the invention.
Figure 2:
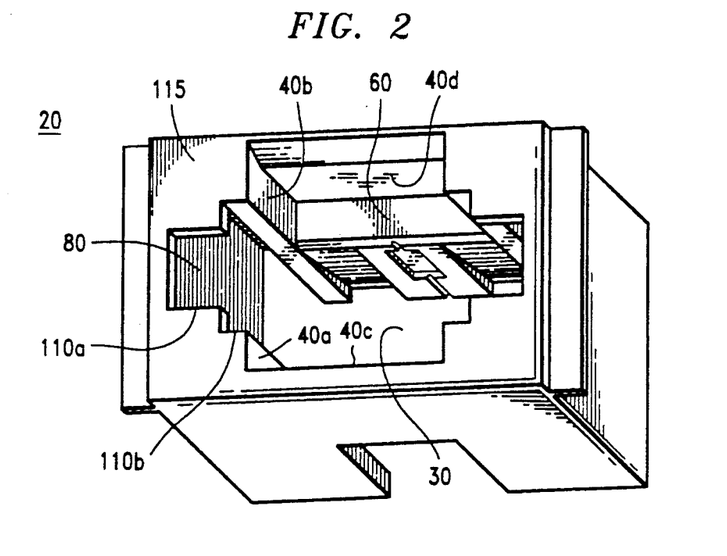
FIG. 2 is a perspective view of a receptacle, made according to one embodiment of the invention.

With reference to FIGS. 1 and 2, the invention, in one embodiment, comprises plug 10 (depicted in FIG. 1) and receptacle 20 (depicted in FIG. 2). Such an embodiment is envisaged, for example, as an optical analog of a modular telephone connector. The plug and receptacle are readily manufactured from, e.g., a polymeric material by molding or machining. The receptacle includes recess 30 into which the plug can be inserted. During insertion, the plug slides smoothly along guiding surfaces, e.g. surfaces 40a–40d. The clearance between the plug and the guiding surfaces should be wide enough to permit smooth motion of the plug, but narrow enough to prevent such gross misalignment of the plug as would interfere with the engagement of the fiber-carrying parts, described below. After insertion through a predetermined distance, a leading surface of the plug, e.g., surface 50, encounters a stopping surface of the receptacle, e.g., surface 60. The meeting of surfaces 50 and 60 prevents further insertion.

Attached to, or integral with, the plug are locking arms 70. If the locking arms are not integral with the plug, they are readily made from, e.g., a polymeric material or from a resilient metal such as beryllium-copper alloy. Corresponding to the locking arms are cutaways 80 formed in front face 115 of the receptacle. Cutaways 80 are so formed that the locking arms do not impede insertion while they are compressed against plug body 90, but when they are expanded away from the body after insertion, they engage the inner faces of the cutaways, preventing withdrawal. For this purpose, the locking arms are advantageously formed with expanded portions 100, which are wider than cutaway region 110a, but narrower than cutaway region 110b. Thus, when expanded, the locking arms prevent withdrawal, but when compressed, e.g. by manual pressure exerted by a human operator, portions 100 lie within regions 110b, permitting withdrawal. Expansion of the locking arms away from the plug body is effected, e.g., by the action of leaf spring 120, which, when compressed, presses against both locking arms 70. The leaf spring is advantageously made from, e.g., a resilient metal such as beryllium-copper alloy.

The plug has a substantially hollow interior, adapted to receive further components, to be described below. The plug body is shaped, e.g., like a box which has an open front and back, and which is defined by four walls: a pair of substantially parallel side walls 130, and, perpendicular to the side walls, substantially parallel walls 140 and 150. The locking arms are attached to the side walls. Leading surface 50 is an edge of wall 140, which is here referred to as the "upper" wall although such designation is for convenience only, since the usefulness of the plug does not depend on the orientation. For convenience, wall 150 is correspondingly referred to here as the "lower" wall. The lower wall includes a tongue portion 160 which extends beyond surface 50 of the upper wall. Attached to the lower wall, and extending over at least a portion of the upper surface of the tongue portion, is guide spring 165. The guide spring is readily manufactured from, e.g., a resilient polymeric material or from a resilient metal such as beryllium-copper alloy.

As shown in FIG. 1, the guide spring extends longitudinally, i.e., along the insertion direction. (The insertion direction is from left to right as viewed in the figure.) The guide spring is configured such that a component having vertical freedom of movement which slides along the guide spring will be urged upward as it is inserted into the plug. (The "upward" direction is defined to be consistent with the designation of wall 140 as "upper" and wall 150 as "lower.") One useful spring configuration is the double ramp configuration shown in the figure.

Figure 3:
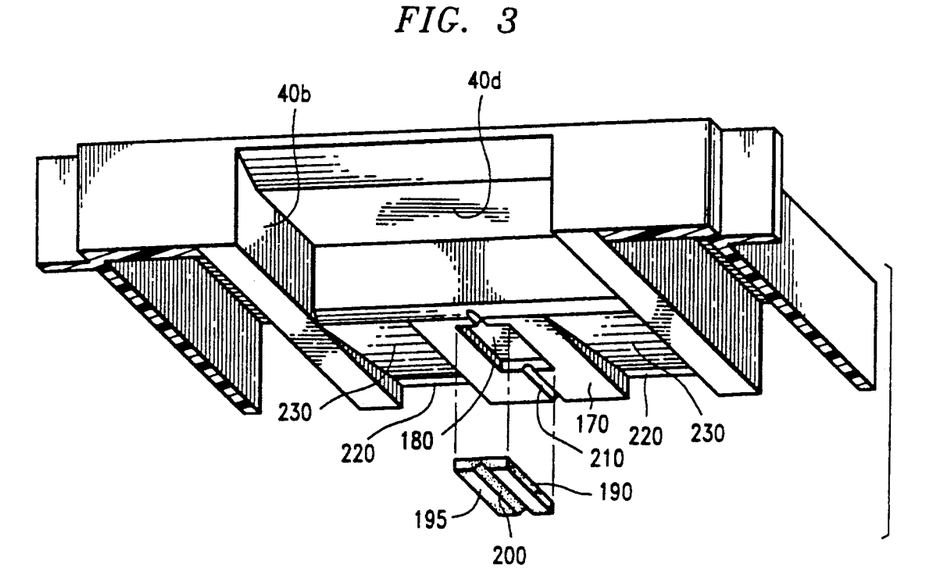
FIG. 3 is a detail of the receptacle of FIG. 2, shown in perspective view.

As shown in FIG. 3, there is formed in upper inside surface 170 of the receptacle a cavity 180. Within the cavity is affixed a flush-fitting silicon block 190. The cavity is situated such that when the plug is fully inserted in the receptacle, block 190 lies directly above tongue portion 160 and is centered with respect to the longitudinally extending centerline of the tongue portion. Longitudinal groove 200, exemplarily an etched V-groove, is formed in the center of the lower (i.e., facing the interior of the receptacle) surface 195 of block 190 and extends the full length of the block. Continuous and collinear with groove 200 is groove 210 formed in surface 170. Groove 210 is formed such that an optical fiber resting in groove 200 and describing a straight line can extend entirely through the receptacle without obstruction. Surface 195 desirably lies flush with surface 170 or extends slightly above it.

With further reference to FIG. 3, surface 170 is substantially parallel to the insertion direction. Disposed on the left and right sides of surface 170 are guiding slots 220. Guiding slots 220 are not parallel to the insertion direction. Instead, in at least an initial portion of each slot 220, the depth of the slot increases in the insertion direction. As a result of such increase, an object resting against a surface 230 of one of slots 220 will tend to move upward (according to the directional convention defined earlier) as it is pushed longitudinally in the insertion direction.

Figure 4:
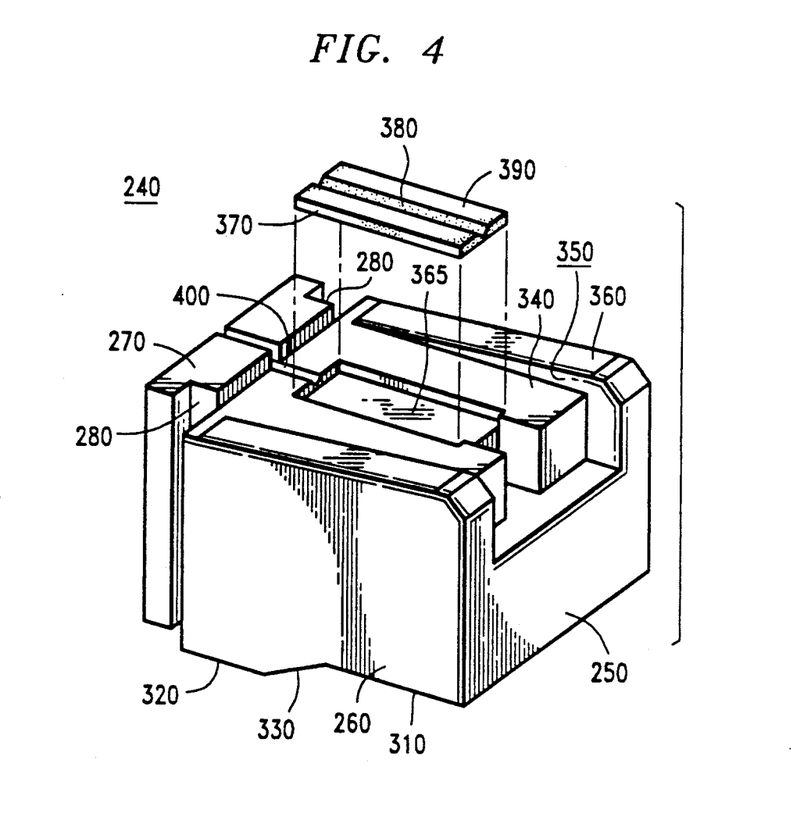
FIG. 4 is a perspective view of a floating head, made according to one embodiment of the invention.
Figure 5:
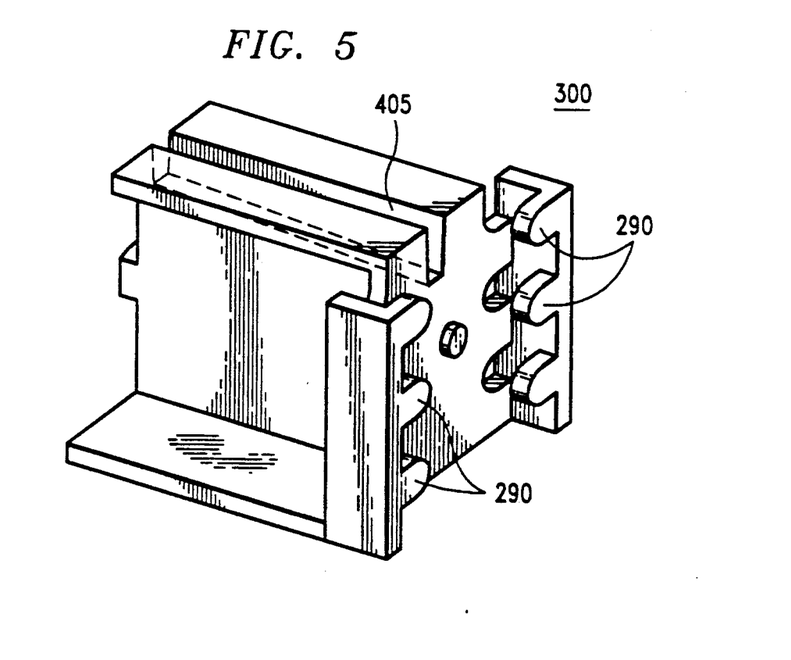
FIG. 5 is a perspective view of a piston, made according to one embodiment of the invention.

With reference to FIG. 4, the invention further comprises a floating head 240, which is advantageously manufactured from polymeric material by, e.g., molding or machining. As is apparent in the figure, the floating head is generally parallelepipedal in shape, having vertical front (i.e., facing in the insertion direction) face 250, and vertical sides 260. The rear face of the floating head is partially cut away to form T-shaped locking portion 270. Side grooves 280 of the locking portion engage finger portions 290 of piston 300, which is depicted in FIG. 5 and described in greater detail below. Returning to FIG. 4, the bottom face of the floating head is partially cut away to form leading lower surface 310 and trailing lower surface 320, separated by ramp or step 330. The top face of the floating head is partially cut away to form platform surface 340, which lies substantially in a horizontal plane, and on either side of the platform surface, wings 350, having upper surfaces 360. As is apparent from the figure, surfaces 360 do not lie in a horizontal plane. Instead, the trailing edge of each surface 360 is coplanar with the platform surface, but proceeding in the insertion direction, each of surfaces 360 rises, in ramp-like fashion, away from the platform surface. Locking portion 270 is advantageously made to vertically extend somewhat beyond the plane of platform surface 340. The resulting vertical offset is useful for initially positioning the floating head as it enters the receptacle. The slope of wing surfaces 360 is matched to the slope of guiding slots 220 such that the wing surfaces 360 slide along slot surfaces 230 with the platform surface maintained substantially parallel to receptacle surface 170 (shown in FIG. 3).

With further reference to FIG. 4, cavity 365 is formed in platform surface 340 of the floating head. Affixed flush within this cavity is silicon block 370, which is substantially identical to silicon block 190 (shown in FIG. 3). Groove 380, which is exemplarily a V-groove, is formed in the upper surface 390 of silicon block 370. Surface 390 desirably lies flush with surface 340 or extends slightly above it. Thus, when the plug and the floating head are fully inserted, surface 195 of silicon block 190 faces and is substantially parallel to surface 390 of silicon block 370. Moreover, when the plug and floating head are fully inserted, block 370 overlies at least a portion of block 190 such that groove 380 overlies at least a portion of groove 200. It is intended that the opposing fiber ends being joined will be held between the two silicon blocks, within facing grooves 380 and 200. For this purpose, each of grooves 380 and 200 is formed such that when an optical fiber of the relevant outer diameter rests in the groove, slightly less than half the fiber diameter is hidden within the groove, and correspondingly, slightly more that half the fiber is exposed above the surface of the relevant silicon block.

Groove 400 is formed in the platform surface, exemplarily by molding. Groove 400 is substantially collinear with groove 380, and extends from the trailing edge of block 370 to the trailing edge of locking portion 270. As a result, when the plug and floating head are fully inserted, a straight-line optical fiber held within groove 380 is able to extend through the back of the plug. (It should be noted in this regard that in use, the plug fiber does not necessarily extend through the back of the plug in a straight line. It may, for example, pass through a deflection groove in the piston, to be described below. In such a case, the fiber may emerge from the back of the plug at an angle to the insertion direction.) The floating head should slide freely within the plug. The clearance between the floating head and the inner walls of the plug should be wide enough to permit the floating head to be positioned centrally within the receptacle, taking into account manufacturing tolerances on the relevant part dimensions.

Figure 6:
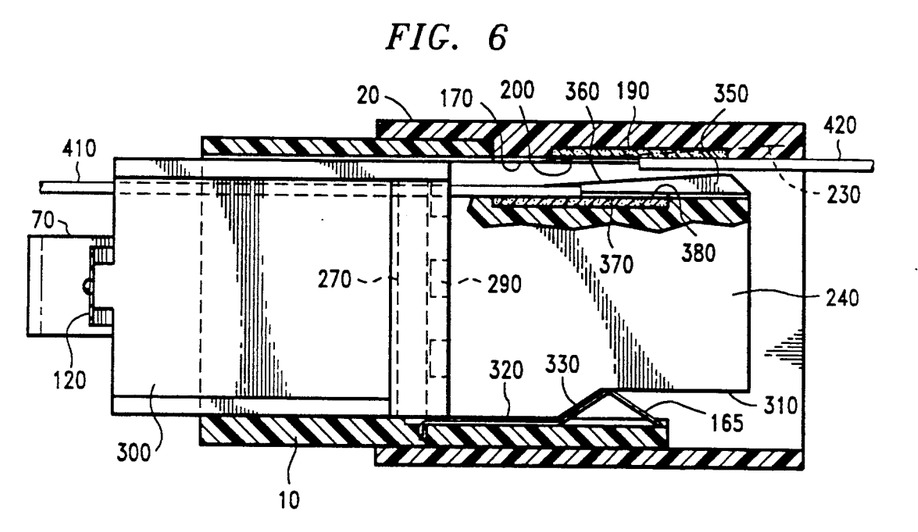
FIG. 6 is a sectional side view of the inventive plug assembly inserted into the inventive receptacle with the piston and floating head in withdrawn position.
Figure 7:
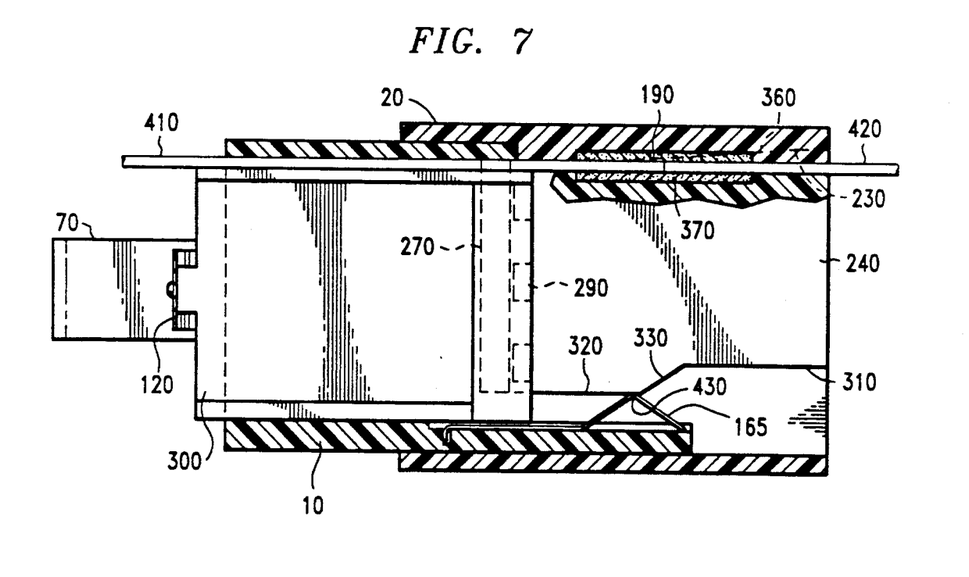
FIG. 7 is a sectional side view of the assembly of FIG. 6 with the piston and floating head in forward position with mating of the plug and receptacle fibers.

The plug assembly, comprising the plug, floating head, and piston (described below), will typically be provided to the end user in factory-assembled form, including an optical fiber (i.e., the "plug" fiber) having an end mounted to the floating head. With reference to FIGS. 6 and 7, and end of plug fiber 410 is affixed within groove 380 by, e.g., gluing within the groove, or by mechanically clamping over an adjacent portion of floating head 240. The fiber end is located approximately in the center of the silicon block, and should be positioned within several fiber diameters of the nominal position. (By "nominal" position is meant the center of the distribution of positions over which acceptable fiber connections can be made.)

With reference to FIG. 5, piston 300 is useful for providing the vertical freedom needed in order for silicon grooves 380 and 200 to capture both fibers during the process of insertion. Finger portions 290 are formed on the leading face of piston 300. As noted above with reference to FIG. 4, the finger portions are captivated by grooves 280 on the floating head. Piston 300 should slide freely within the plug. A groove 405 is desirably formed in the upper surface of the piston in order to accommodate the extension of the plug fiber through the back of the plug. Such a groove may be straight, and substantially collinear with groove 400 in the floating head. Alternatively, as noted above, groove 405 is readily made such that it adjoins groove 400 at its forward edge, but curves away from the axis of groove 400 such that the fiber exits the plug at an angle to the insertion direction.

Figure 8:
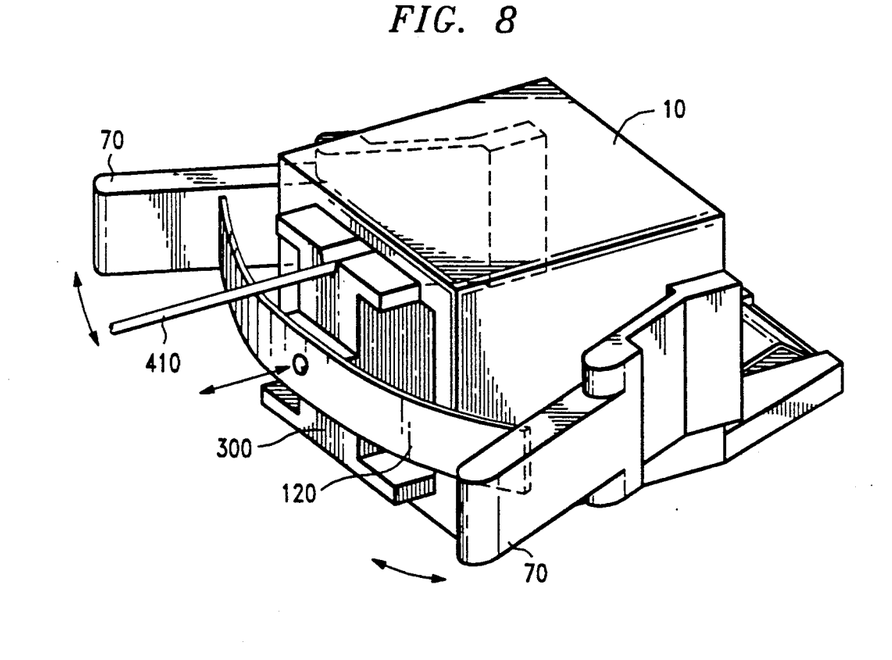
FIG. 8 is a perspective view of a plug assembly made according to one embodiment of the invention, showing a leaf spring and the engagement of the leaf spring with the piston.

In use, the motion of the piston is controlled by leaf spring 120, and thus ultimately by the compression and release of locking arms 70. For example, in the exemplary arrangement shown in FIG. 8, the trailing end of the piston is attached to the center of the leaf spring. When the locking arms are compressed, the spring bends so as to pull the piston away from the receptacle. Conversely, the piston is urged toward the receptacle when the locking arms are released.

An end of the fiber attached to the receptacle, here called the "receptacle" fiber, will typically be mounted in the relevant silicon block by the end user. With reference to FIGS. 6 and 7, an end of receptacle fiber 420 is affixed within groove 200, e.g., by gluing or by mechanically clamping over an adjacent portion of surface 170 (see FIG. 3) distal the plug.

In use, a plug assembly, including a mounted plug fiber is provided, and a receptacle fiber end is mounted in the receptacle. The fiber connection is effected by compressing the locking arms and inserting the plug assembly into the receptacle. The locking arms are then released. The fiber connection is subsequently broken by simply compressing the locking arms and withdrawing the plug assembly.

The motion of the floating head during insertion is illustrated in FIGS. 6 and 7. As is apparent from the figures, spring 165 pushes against surface 320 of the floating head such that while it is being inserted, the floating head is urged upward, as viewed in the figure. (The sliding engagement of finger portions 290 in grooves 280 allows the floating head to float in a direction that is substantially perpendicular to the insertion direction. As shown in the figure, this direction makes an angle of 90° relative to the insertion direction. Various alternative embodiments are also envisaged, in which the angle made by such substantially perpendicular direction deviates from 90° by up to about 5°.) As a consequence of such upward urging, wing surfaces 360 (see FIG. 4) come into contact with guiding slot surfaces 230 (see FIG. 3) and slide along surfaces 230. When surfaces 360 first encounter surfaces 230, each fiber will generally overlap its respective, opposing silicon groove by a small amount without yet touching the groove. As insertion progresses, the plug fiber end advances toward the receptacle fiber end along the insertion direction. Simultaneously, because surfaces 360 and 230 are inclined, the sliding of those surfaces decreases the vertical offset between each fiber end and its opposing silicon groove.

At some point during insertion, while a gap still remains between the mating fiber ends along the insertion direction, each fiber end is captured by its respective, opposing silicon groove. Thereafter, the motion of the floating head is directed by sliding contact between the fibers and the silicon grooves. As a result, surfaces 360 and 230 separate, and the floating head advances in a direction substantially parallel to the insertion direction, until the mating fiber ends abut and make touching contact. Insertion is completed when such abutting contact is made. Thereafter, spring 165 urges the opposing silicon blocks together such that the mating fibers remain captured between the opposing silicon grooves. Leaf spring 120 forces the fiber ends together, and thereby maintains abutting contact between them.

It should be noted in this regard that the mating fiber ends are directed into final alignment by the silicon grooves. As a consequence, the manufacturing tolerances of the plug, floating head, and receptacle are generally not of critical importance, provided only that the respective fiber ends are readily captured by the relevant silicon grooves during insertion. However, because the initial guidance is provided by wings 350 and guiding slots 220, those particular parts must be formed according to an appropriate standard of accuracy. The appropriate standard applies to the side-to-side (i.e., the "lateral") locations and dimensions of the wings and guiding slots. The standard is that the wings and guiding slots must direct the floating head accurately enough to bring the longitudinal centerlines of the two silicon blocks into substantially the same vertical plane (i.e., such that the mathematical extension of one lies directly above the mathematical extension of the other), with a lateral offset which is less than about one relevant fiber diameter and clearance sufficient to allow the offset to decrease substantially to zero when mating of the fibers is completed.

The description set out above is intended for pedagogical purposes and describes only one of many possible embodiments for the invention. For example, an alternative, and currently preferred, embodiment includes the alternative plug assembly depicted in FIG. 9. In the depicted plug assembly, the force urging forward and reverse motion of the piston is transmitted by helical spring 500 instead of by leaf spring 120 of FIG. 1. Each of locking arms 510 has a portion 520 proximal the plug body and a portion 530 distal the plug body, separated by a hinge 540. (The hinge may be integral with the proximal and distal portions.) The proximal portions function to lock the plug within the receptacle as described above. The distal portions fold toward the plug body and engage the end of the piston distal the floating head. Compression of the proximal portions of the locking arms against the plug body causes the piston-engaging ends of the locking arms to move away from the receptacle. This tends to compress the helical spring, and to withdraw the piston and floating head. Conversely, when the proximal portions are released, the helical spring extends. This tends to cause the piston and floating head to slide in the forward insertion direction.

Figure 9:
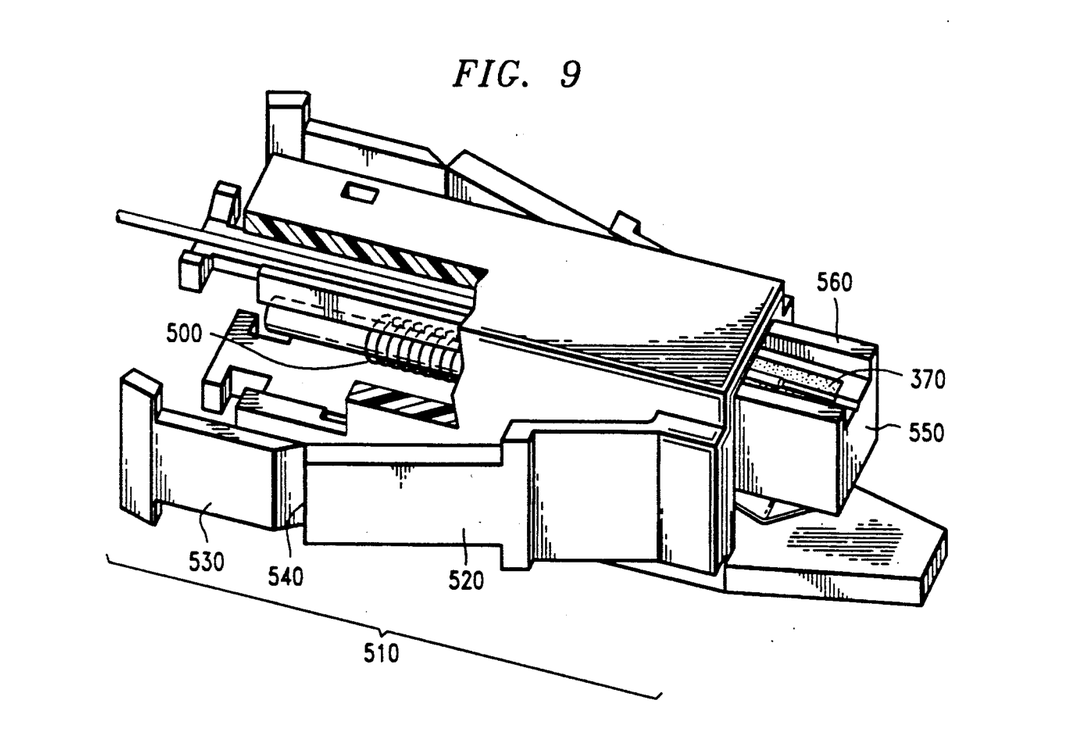
FIG. 9 is a perspective view of the inventive plug assembly in an alternative embodiment.

The currently preferred embodiment also includes an alternative floating head 550, which is also depicted in FIG. 9. In the alternative floating head, silicon block 370 is not horizontal, but rather is tilted by an angle lying typically in the range 3°–5°, and preferably about 3°, with the leading edge lying more deeply than the trailing edge relative to wing surface 560 of the floating head. The opposing silicon block in the receptacle is correspondingly tilted. During insertion, the initial motion of the alternative floating head is substantially horizontal rather than diagonal. Accordingly, the guiding slots and wings are not ramped (contrary to the earlier described embodiment), and the initial motion of the floating head is guided by substantially horizontal surfaces, such as surface 560. When each fiber end is captured in its respective opposing silicon groove, the motion of the floating head changes to diagonal motion until the fiber ends make contact. Thus, the trajectory of the floating head is the converse of that discussed in connection with the earlier described embodiment.

In the currently preferred embodiment, spring 165 (see FIG. 1) is advantageously attached to surface 310 of the floating head (see FIG. 4) instead of being attached to the plug housing.

EXAMPLE

A plug, receptacle, floating head, and piston corresponding substantially to the first embodiment described above were fabricated from polycarbonate plastic material. Maximum outside dimensions of the receptacle were: height, 0.67 in. (17 mm), length, 1.0 in (25 mm), and width, 1.0 in. (25 mm). The minimum receptacle wall thickness was 0.05 in. (1.3 mm). Guiding grooves, as described, were formed in the receptacle with a slope angle of 5.0°. Maximum outside dimension of the plug were: height, 0.60 in. (15 mm), length (exclusive of the tongue portion), 1.0 in. (25 mm), width, 0.54 in. (14 mm), and length of tongue portion, 0.35 in. (8.9 mm). The plug wall thickness was 0.05 in. (1.3 mm). The floating head was manufactured from a solid block of plastic. Maximum outside dimensions of the floating head were height, 0.375 in. (9.5 mm), length, 0.50 in. (13 mm), and width, 0.35 in. (8.9 mm). The locking portion was 0.10 in. (2.5 mm) long, and 0.25 in. (6.3 mm) wide. Each locking groove was 0.045 in. (1.1 mm) long and 0.025 in. (0.63 mm) deep. The step height between the two lower surfaces was 0.05 in. (1.3 mm). The wings were inclined at 5.0°. The locking portion of the piston was 0.375 in. (9.5 mm) high. The piston included two locking fingers in each side. Each locking finger fit into a corresponding locking groove with a total front-to-back clearance of 0.005–0.010 in. (0.13–0.25 mm) and a total side-to-side clearance of 0.010 in. (0.25 mm).

Each of the two silicon blocks was 0.255 in. (6.5 mm) long, 0.085 in. (2.2 mm) wide, and 0.018 in. (0.46 mm) high. Running along the longitudinal axis of one face of each silicon block was a crystallographically etched V-groove. The vertex half-angle of each such groove was 36°, and the depth of each such groove was 0.003 in. (0.076 mm).

Affixed in each V-groove was a multiple-mode optical fiber having an outer diameter of 125 micrometers. The fibers were affixed by clamping or gluing in place. Before the optical connection was made, a small amount of index-matching gel was deposited on the plug fiber tip or the receptacle silicon block.

In a group of trials of the optical connection, insertion losses in the range 0.05–0.5 dB were demonstrated.

We claim:

1. Apparatus for making an optical connection between ends of respective first and second optical fibers, comprising:
   a first silicon member having a substantially planar first principal surface and a first groove formed in said first surface such that the first fiber end can be supported in a portion of the first groove;
   a second silicon member having a substantially planar second principal surface and a second groove formed in said second surface such that the second fiber end can be supported in a portion of the second groove;
   a plug housing having a hollow interior portion and a longitudinal axis;
   a receptacle which incorporates the second silicon member and which includes a cavity adapted to receive therewithin at least a portion of the plug housing when the plug housing is inserted along a direction, to be referred to as the insertion direction, which is parallel to the longitudinal axis;

a floating head which incorporates the first silicon member and which is capable of sliding longitudinally within the plug housing and which is adapted to be at least partially inserted within the receptacle such that the first and second principal surfaces are substantially parallel and at least partially overlap and face each other;

a piston which is at least partially insertable within the plug housing and capable of sliding longitudinally within the plug housing, the piston and floating head being mechanically engaged such that motion of the piston along the insertion direction tends to insert the floating head into the receptacle, motion of the piston opposite to the insertion direction tends to withdraw the floating head from the receptacle, and during at least a portion of the insertion step, the floating head is capable of moving substantially independently of the piston in one direction substantially perpendicular to the insertion direction;

guiding surfaces, integral with the receptacle, for directing the motion of the floating head during insertion, such that the perpendicular distance between the first and second principal surfaces initially decreases until a portion of the first fiber is captured within the second groove and a portion of the second fiber is captured within the first groove, and thereafter, the first and second fibers contactingly slide within, respectively, the second and first grooves such that the longitudinal axes of the first and second fiber end portions are substantially collinear and the first fiber end approaches the second fiber end along the longitudinal axis;

first resilient means for urging the first and second silicon blocks together after the first and second grooves have, respectively, captured the second and first fibers;

second resilient means for applying a force tending to advance the first fiber end toward the second fiber end just until the fiber ends make abutting contact, and tending to maintain such abutting contact; and at least one compressible locking member affixed to an external surface of the plug housing, adapted to engage a corresponding slot in the receptacle such that when the locking member is compressed toward the plug housing, the plug housing is freely inserted or withdrawn relative to the receptacle, but when the locking member is released after insertion, the locking member prevents withdrawal of the plug housing.

2. Apparatus of claim 1, wherein the second resilient means comprise a helical spring.

3. Apparatus of claim 2, wherein the locking member has a distal and a proximal end; the proximal end is affixed to the plug housing; the locking member further incorporates a hinge intermediate the distal and proximal ends; and the proximal end is adapted to engage the end of the piston distal the receptacle such that when the locking member is compressed toward the plug housing, the helical spring tends to be compressed and the piston tends to withdraw from the receptacle, and when the locking member is released, the helical spring tends to elongate and the piston tends to be urged toward the receptacle.

4. Apparatus of claim 1, wherein the second resilient means comprise a leaf spring.

5. Apparatus of claim 1, wherein the first and second silicon principal surfaces are substantially parallel to a plane which contains the insertion direction.

6. Apparatus of claim 1, wherein the first and second silicon principal surfaces are substantially parallel to a plane which lies at an angle of 3°-5° to the insertion direction.

* * * * *